United States Patent
Bogin et al.

(10) Patent No.: US 8,291,415 B2
(45) Date of Patent: Oct. 16, 2012

(54) PAGING INSTRUCTION FOR A VIRTUALIZATION ENGINE TO LOCAL STORAGE

(75) Inventors: Zohar Bogin, Folsum, CA (US); Suryaprasad Kareenahalli, Folsom, CA (US); Rajeev K. Nalawadi, El Dorado Hills, CA (US); Christopher D. Kral, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 960 days.

(21) Appl. No.: 12/347,988

(22) Filed: Dec. 31, 2008

(65) Prior Publication Data
US 2010/0169885 A1 Jul. 1, 2010

(51) Int. Cl.
*G06F 9/455* (2006.01)
(52) U.S. Cl. ............................................... 718/1; 710/62
(58) Field of Classification Search .................... 703/24, 703/25, 27; 710/62, 63, 64
See application file for complete search history.

(56) References Cited

U.S. PATENT DOCUMENTS

| | | | |
|---|---|---|---|
| 6,557,061 B1 * | 4/2003 | Hindie et al. | 710/72 |
| 6,725,289 B1 * | 4/2004 | Waldspurger et al. | 710/9 |
| 7,111,086 B1 * | 9/2006 | Ecoleston et al. | 710/33 |
| 7,263,593 B2 * | 8/2007 | Honda et al. | 711/205 |
| 7,761,618 B2 * | 7/2010 | Avraham et al. | 710/36 |
| 2006/0064523 A1 * | 3/2006 | Moriki et al. | 710/62 |
| 2006/0136667 A1 * | 6/2006 | Shultz et al. | 711/118 |
| 2007/0220246 A1 * | 9/2007 | Powell et al. | 713/2 |

\* cited by examiner

*Primary Examiner* — Eric Coleman
(74) *Attorney, Agent, or Firm* — Thomas R. Lane

(57) ABSTRACT

Apparatuses, methods, and systems for paging instructions for a virtualization engine to local storage. An apparatus includes a processor, a physical device controller, a virtualization engine, system memory, and local storage. The physical device controller is to be shared by a plurality of virtual machines created by a virtual machine monitor installed on a processor. The virtualization engine is to represent the physical device controller as a plurality of virtual device controllers available to be allocated to the plurality of virtual machines. The local storage is separate from the physical memory to store instructions transferred from the system memory for execution by the virtualization engine.

1 Claim, 2 Drawing Sheets

METHOD 200

PAGING INSTRUCTION FOR A VIRTUALIZATION ENGINE TO LOCAL STORAGE

BACKGROUND

1. Field

The present disclosure pertains to the field of information processing, and more particularly, to the field of virtualization in an information processing system.

2. Description of Related Art

Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization environment.

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, may be intercepted, i.e., cause the processor to exit the virtualization environment so that a VMM may operate, for example, to implement virtualization policies.

A physical resource in the system, such as an input/output device controller, may be assigned or allocated to a VM on a dedicated basis. Alternatively, a physical resource may be shared by multiple VMs, by intercepting all transactions involving the resource so that the VMM may perform, redirect, or restrict each transaction. A third approach may be to design the physical resource to provide the capability for it to be used as multiple virtual resources.

BRIEF DESCRIPTION OF THE FIGURES

The present invention is illustrated by way of example and not limitation in the accompanying figures.

DETAILED DESCRIPTION

The present invention may be embodied in an apparatus or method for paging instructions for a virtualization engine to local storage, as described below. In the description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the description of the present invention.

It may be desirable for a single physical device controller to be shared by multiple virtual machines, without requiring that a VMM intercept all transactions involving the device controller or that the device controller be redesigned to support virtualization. Therefore, embodiments of the invention may be used to support the virtualization of a physical device controller by a virtualization engine.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or an expression that is implemented or embodied in a hardware structure (e.g., flash memory or read only memory). Examples of firmware are microcode, writable control store, and micro-programmed structure.

Figure 1:
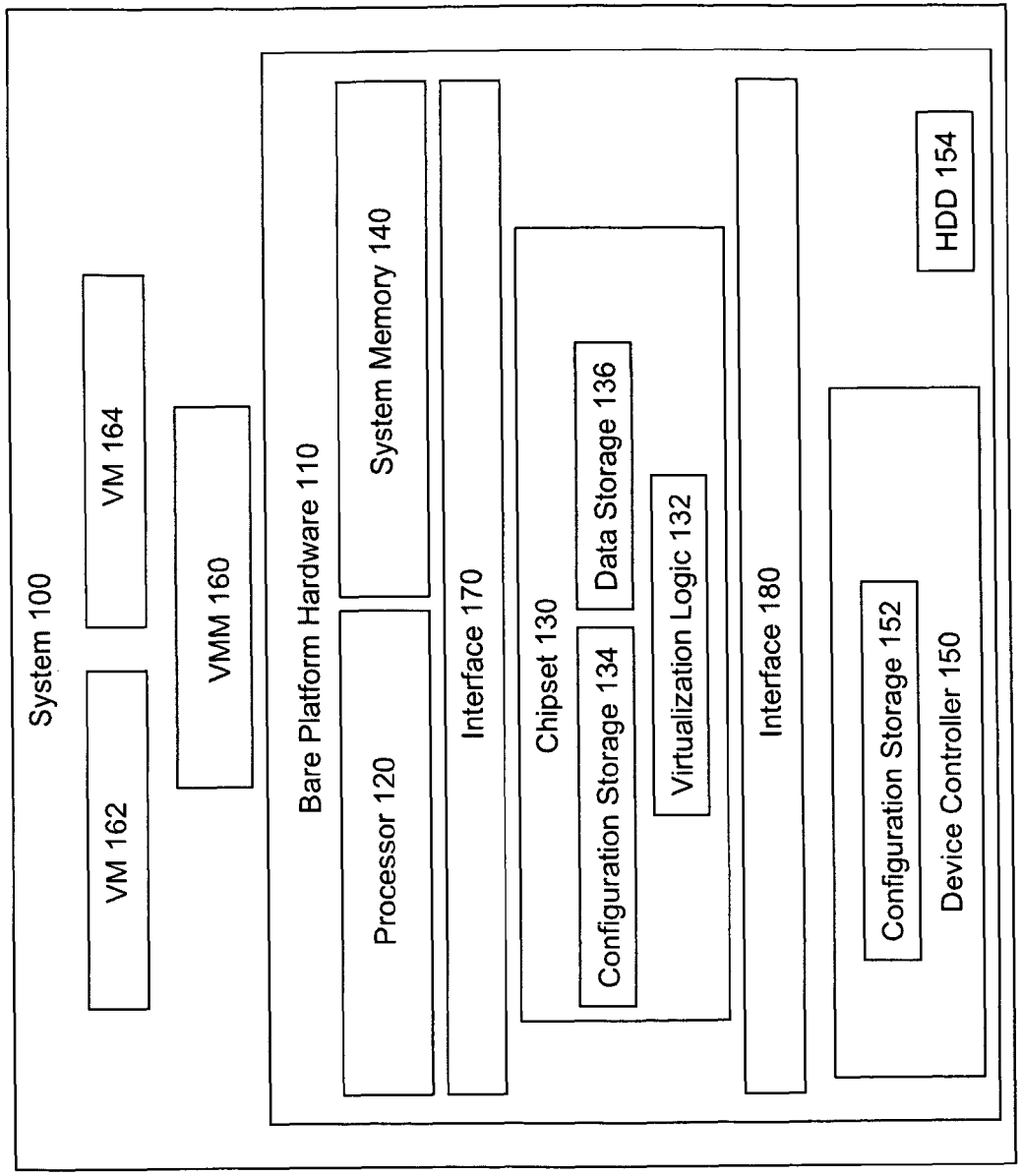
FIG. 1 illustrates an apparatus for paging instructions for a virtualization engine to local storage according to an embodiment of the present invention.

FIG. 1 illustrates information processing system 100, in which transactions may be injected according to an embodiment of the present invention. Information processing system 100 includes bare platform hardware 110, which may be any apparatus capable of executing any OS, VMM, or other software. For example, bare platform hardware 110 may be the hardware of a personal computer, a mainframe computer, a portable computer, a handheld device, a set-top box, a server, or any other computing system. In this embodiment, bare platform hardware 110 includes processor 120, chipset 130, system memory 140, and device controller 150.

Processor 120 may be any component having one or more execution cores, where each execution core may be based on any of a variety of different types of processors, including a general purpose microprocessor, such as a processor in the Intel® Pentium® Processor Family, Itanium® Processor Family, or other processor family from Intel® Corporation, or another processor from another company, or a digital signal processor or microcontroller. Although FIG. 1 shows only one such processor 120, bare processing hardware 110 may include any number of processors, including any number of multicore processors, each with any number of execution cores, and any number of multithreaded processors, each with any number of threads.

Chipset 130 may be any group of circuits and logic that supports memory operations, input/output operations, configuration, control, internal or external interface, connection, or communications functions (e.g., "glue" logic and bus bridges), and/or any similar functions for processor 120 and/or system 100. Individual elements of chipset 130 may be grouped together on a single chip, a pair of chips, dispersed among multiple chips, and/or be integrated partially, totally, redundantly, or according to a distributed approach into one or more processors, including processor 120. In this embodiment, chipset 130 includes virtualization engine 132 for virtualizing a physical device controller according to an embodiment of the invention, as described below. In other embodiments, virtualization engine 132 may be included elsewhere in system 100.

System memory 140 may include any medium on which information, such as data and/or instructions, may be stored, such as static or dynamic random access memory, semiconductor-based read-only or flash memory, magnetic or optical disk memory, or any other type of medium readable by processor 120, or any combination of such mediums.

Device controller 150 may represent a controller for any type of I/O, peripheral, or other device that may be used by guest software running in a VM, such as a hard disk controller, an audio controller, a network interface controller, a peripheral bus controller, etc. Device controller 150 may be embodied in a discrete component, or may be included in an integrated component with any other device controllers. In one embodiment, device controller 150 may represent a function in a multifunctional I/O, peripheral, or other device controller. Device controller 150 may include configuration storage 152 to store configuration information. In one embodiment, device controller 150 may be a hard disk controller connected to or integrated into hard disk drive 154.

Processor 120, chipset 130, system memory 140, and device controller 150 may be coupled to or communicate with each other according to any known approach, such as directly or indirectly through one or more parallel, sequential, pipelined, asynchronous, synchronous, wired, wireless, or other bus or point-to-point connection or means of communication. For example, in this embodiment, processor 120 and chipset 130 may be coupled to system memory 140 through interface 170, and chipset 130 may be coupled to device controller 150 through interface 180. System 100 may also include any number of additional agents, components, or connections.

System 100 also includes VMM 160 and VMs 162 and 164. VMM 160 may be any software, firmware, or hardware host installed to run on or accessible to bare platform hardware 110, to present VMs, i.e., abstractions of bare platform hardware 110, to guests, or to otherwise create VMs, manage VMs, and implement virtualization policies within system 100. In other embodiments, a host may be any VMM, hypervisor, OS, or other software, firmware, or hardware capable of controlling bare platform hardware 110. A guest may be any OS, any VMM, including another instance of VMM 160, any hypervisor, or any application or other software.

Each guest expects to access resources, such as processor and platform registers, memory, and input/output devices, of either bare platform hardware 110 or a platform virtualized by VMM 160, according to the architecture of the processor and the platform presented in the VM. FIG. 1 shows two VMs, 162 and 164, on each of which may be installed a guest OS and any number of guest applications. Although FIG. 1 shows two VMs, any number of VMs may be created, and any number of guest OSes and guest applications may be installed to run on each VM within the scope of the present invention.

Returning to chipset 130, virtualization engine 132 may include any circuitry, logic, or other structure, such as firmware, to represent physical device controller 150 as a number of virtual device controllers, each of which may be allocated by VMM 160 to a different VM. Chipset 130 also includes configuration storage 134 and local storage 136. Configuration storage 134 and local storage 136 may include any medium on which information may be stored; for example, configuration storage 134 may include programmable registers and local storage 136 may include static random access memory ("SRAM"). Virtualization engine 132 may read and write information from and into configuration storage 134 and/or local storage 136 to determine and to maintain information related to virtualizing physical device controller 150.

In addition, virtualization engine 132 may execute instructions from local storage 136. In one embodiment, local storage 136 may be SRAM. To save cost, the size of local storage 136 may be less than the total size of the code to be run by virtualization engine 132. Instructions to be run by virtualization engine 132 may be stored on a mass storage device, such as hard disk 154, and copied to system memory 140, for example in one or more direct memory access ("DMA") transactions from device controller 150. Subsets (e.g., pages) of these instructions may then be copied (for example, in a DMA transaction) to local storage 136 on an as needed basis for execution by virtualization engine 132. After execution, these subsets may be replaced in local storage 136 by other instructions or data. Control of the paging may be included in firmware within or accessible to virtualization engine 132, and status information needed to maintain the paging process may be stored in a different region of local storage 136.

It may be desirable to use embodiments of the present invention for virtualization engine 132 to execute instructions to support infrequent operations such as a block erase by a NAND flash memory controller or encryption or decryption by a hard disk controller.

Figure 2:
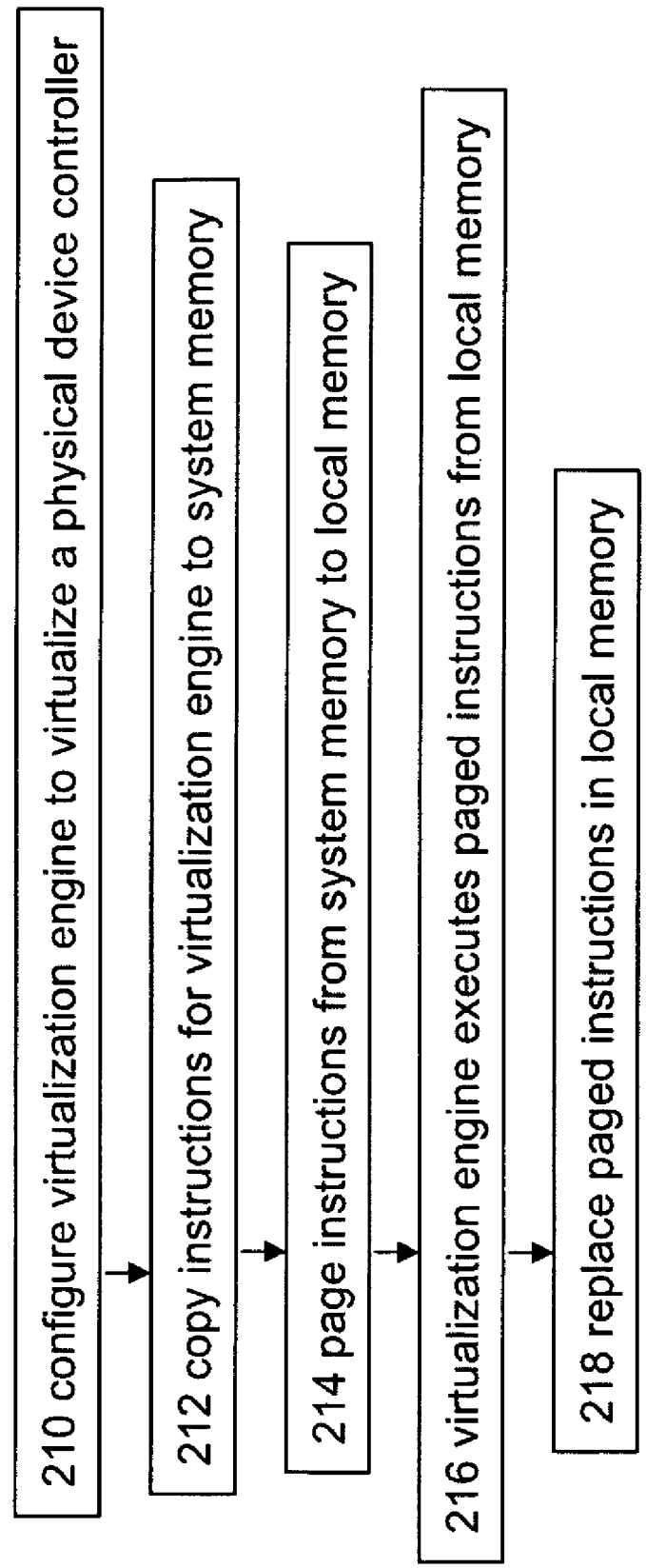
FIG. 2 illustrates a method for paging instructions for a virtualization engine to local storage according to an embodiment of the present invention.

FIG. 2 illustrates method 200, in which instructions to be executed by a virtualization engine may be paged to a local storage according to an embodiment of the present invention. In the description of the method embodiment of FIG. 2, reference may be made to elements of the system embodiment of FIG. 1; however, method embodiments of the invention are not limited in this respect.

In box 210, virtualization engine 132 is configured to virtualize physical device controller 150. In box 212, instructions to be executed by virtualization engine 132 are copied from hard disk 154 to system memory 140. In box 214, a subset of the instructions to be executed by virtualization engine 132 are copied from system memory 140 to local memory 136. In box 216, the subset of instructions is executed by virtualization engine 132. In box 218, the subset of instructions is replaced from local memory 136.

Within the scope of the present invention, method 200 may be performed with illustrated boxes omitted, with additional boxes added, or with a combination of reordered, omitted, or additional boxes.

Any component or portion of a component designed according to an embodiment of the present invention may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, apparatuses, methods, and systems for paging instructions for a virtualization engine to local storage have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus comprising:
a processor;
a physical device controller to be shared by a plurality of virtual machines created by a virtual machine monitor installed on the processor;
a virtualization engine to represent the physical device controller as a plurality of virtual device controllers available to be allocated to the plurality of virtual machines, the virtualization engine coupled to the processor through a first interface and coupled to the physical device controller through a second interface;
system memory coupled to the processor and the virtualization engine through the first interface; and
local storage separate from the system memory to store instructions copied from the system memory for execution by the virtualization engine.

* * * * *